(12) United States Patent
Cao et al.

(10) Patent No.: US 12,202,760 B2
(45) Date of Patent: Jan. 21, 2025

(54) GLASS FIBER NOZZLE STRUCTURE, BUSHING AND PRODUCTION DEVICE

(71) Applicant: JUSHI GROUP CO., LTD., Tongxiang (CN)

(72) Inventors: Guorong Cao, Tongxiang (CN); Weirong Ma, Tongxiang (CN); Zhangbin Zhu, Tongxiang (CN); Qixin Zhu, Tongxiang (CN); Xuming Shen, Tongxiang (CN); Haixing Wang, Tongxiang (CN)

(73) Assignee: JUSHI GROUP CO., LTD., Tongxiang (CN)

( * ) Notice: Subject to any disclaimer, the term of this patent is extended or adjusted under 35 U.S.C. 154(b) by 234 days.

(21) Appl. No.: 17/760,334

(22) PCT Filed: Dec. 10, 2021

(86) PCT No.: PCT/CN2021/137163
§ 371 (c)(1),
(2) Date: Aug. 8, 2022

(87) PCT Pub. No.: WO2023/092699
PCT Pub. Date: Jun. 1, 2023

(65) Prior Publication Data
US 2023/0250008 A1   Aug. 10, 2023

(30) Foreign Application Priority Data
Nov. 29, 2021 (CN) .......................... 202111441759.X

(51) Int. Cl.
*C03B 37/083* (2006.01)
*C03C 25/20* (2006.01)
(52) U.S. Cl.
CPC ............ *C03B 37/083* (2013.01); *C03C 25/20* (2013.01)

(58) Field of Classification Search
CPC .................................................... C03B 37/083
See application file for complete search history.

(56) References Cited

U.S. PATENT DOCUMENTS 5,017,205 A    5/1991  Shioura et al.
5,462,571 A *  10/1995 Taguchi ................ C03B 37/075
                                                65/495

(Continued)

FOREIGN PATENT DOCUMENTS

CN          87202590 U     12/1987
CN         201990594 U      9/2011
(Continued)

OTHER PUBLICATIONS

Translation of WO 2018/123888 (Year: 2018).*
(Continued)

*Primary Examiner* — Cynthia Szewczyk
(74) *Attorney, Agent, or Firm* — Cooper Legal Group, LLC

(57) ABSTRACT

The present application provides a glass fiber nozzle structure, bushing and production device. The glass fiber nozzle structure includes a nozzle body and a hole provided on the nozzle body. The hole includes an upper hole portion and a lower hole portion communicated with the upper hole portion and located below the upper hole portion. The lower hole portion has an elongated cross-section. A projection of the lower hole portion is located within a projection of the upper hole portion in a projection on a plane perpendicular to an axis line of the lower hole portion. A length and a width of the lower hole portion have a ratio of 5:1 to 12:1. The glass fiber nozzle of the present application has a simple structure and a long service cycle, and an aspect ratio of flat glass fibers produced by the nozzle structure is maintained (Continued)

between 2.7 and 4.2, thereby effectively improving performance of the flat glass fibers.

13 Claims, 6 Drawing Sheets

(56) References Cited

U.S. PATENT DOCUMENTS

| | | | |
|---|---|---|---|
| 2005/0086977 | A1 | 4/2005 | Otaki et al. |
| 2020/0024177 | A1 | 1/2020 | Fujii et al. |

FOREIGN PATENT DOCUMENTS

| | | | | |
|---|---|---|---|---|
| CN | 103193384 | A | * | 7/2013 |
| CN | 104921735 | A | | 9/2015 |
| CN | 106242266 | A | | 12/2016 |
| CN | 109307641 | A | | 2/2019 |
| CN | 110337422 | A | | 10/2019 |
| CN | 209815968 | U | | 12/2019 |
| CN | 210140530 | U | | 3/2020 |
| CN | 211497394 | U | | 9/2020 |
| CN | 111925114 | A | | 11/2020 |
| CN | 213680405 | U | | 7/2021 |
| EP | 3098205 | A1 | | 11/2016 |
| JP | S61219732 | A | | 9/1986 |
| JP | H02275729 | A | | 11/1990 |
| JP | H07330368 | A | | 12/1995 |
| JP | H1143343 | A | * | 2/1999 |
| JP | 2000103635 | A | * | 4/2000 ........... C03B 37/075 |
| JP | 2000335932 | A | | 12/2000 |
| JP | 2003048740 | A | | 2/2003 |
| JP | 2003267746 | A | | 9/2003 |
| JP | 2009007252 | A | | 1/2009 |
| KR | 102300520 | B1 | | 9/2021 |
| WO | WO-2018123888 | A1 | * | 7/2018 ........... C03B 37/083 |

OTHER PUBLICATIONS

Translation of JP 2000-103635 (Year: 2000).*
Translation of JP H1143343 (Year: 1999).*
Translation of CN103193384 (Year: 2013).*
Notice of Reasons for Refusal as cited in JP2022-552645, mailed Jan. 4, 2024, 7 pages.
First Office Action cited in CN202111441759.X, mailed May 18, 2022, 26 pages.
Second Office Action cited in CN202111441759.X, mailed Sep. 15, 2022, 19 pages.
Decision of Rejection cited in CN202111441759.X, mailed Jan. 5, 2023, 15 pages.
International Search Report cited in PCT/CN2021/137163, mailed Aug. 29, 2022, 5 pages.
Office Action cited in Egyptian Application 1308-2022, mailed Aug. 28, 2024, 9 pages.

* cited by examiner

GLASS FIBER NOZZLE STRUCTURE, BUSHING AND PRODUCTION DEVICE

CROSS-REFERENCE TO RELATED APPLICATIONS

The present application is a national stage entry under 35 U.S.C. § 371 of International Application No. PCT/CN2021/137163, filed on Dec. 10, 2021, which claims priority to Chinese Patent Application No. 202111441759.X, filed on Nov. 29, 2021 and entitled "Glass Fiber Nozzle Structure, Bushing and Production Device". International Application No. PCT/CN2021/137163 and Chinese Patent Application No. 202111441759.X are incorporated herein by reference in their entireties.

TECHNICAL FIELD

The present application relates to the technical field of winding equipment, and in particular, to a glass fiber nozzle structure, bushing and production device.

BACKGROUND

At present, continuous glass fibers are produced in the following process: the raw material flows to one or more bushings after being melted in a tank furnace, and there is a nozzle on the bottom plate of the bushing. The continuous glass fibers are formed from the glass after passing through the nozzle under the pulling of a fiber drawing machine. As a kind of continuous glass fiber, the flat cross-section glass fiber has a surface area larger than that of the circular cross-section glass fiber, and is more conducive to improving the interfacial adhesion with resin. In recent years, the flat cross-section glass fiber has been widely used in the field of composite materials. The equipment and process to produce flat cross-section glass fiber differ across the industry.

In the prior art, the nozzle used in the process of producing flat glass fibers has a relatively complex structure, and has the problems of difficult processing and easy damage, resulting in a short service cycle of the nozzle and the bushing, which is not conducive to continuous production of the flat glass fibers.

SUMMARY

The present application is intended to solve the above problems. An objective of the present application is to provide a glass fiber nozzle structure, bushing and production device to solve any one of the above problems.

To achieve the above objective, the present application is implemented by the following technical solutions.

According to a first aspect of the present application, a glass fiber nozzle structure is provided, including a nozzle body and a hole provided on the nozzle body.

The hole includes an upper hole portion and a lower hole portion communicated with the upper hole portion and located below the upper hole portion. The lower hole portion has an elongated cross-section. A projection of the lower hole portion is located within a projection of the upper hole portion in a projection on a plane perpendicular to an axis line of the lower hole portion. A length and width of the lower hole portion have a ratio of 5:1 to 12:1.

The upper hole portion may have an elongated cross-section, and an extension direction of the cross-section of the upper hole portion may be the same as an extension direction of the cross-section of the lower hole portion.

An axis line of the upper hole portion and the axis line of the lower hole portion may coincide.

A length and a width of the cross-section of the upper hole portion may have a ratio of 5:1 to 8:1.

A cross-sectional area of the upper hole portion may be tapered from top to bottom.

A volume of the upper hole portion is 2-5 times a volume of the lower hole portion.

The lower hole portion may include an inlet and an outlet. The inlet may be communicated with the upper hole portion. The outlet may be configured for outflow of molten glass in a molten state.

The outlet may have a length between 6 mm and 8 mm and a width between 0.6 mm and 1.2 mm.

The nozzle body may include a first body and a second body which are connected. The second body may protrude from a lower surface of the first body. The upper hole portion may be provided in the first body. The lower hole portion may be at least partially located in the second body.

The upper hole portion may have a height of 0.8 mm-1.4 mm; and/or,

The lower hole portion may have a height of 0.8 mm-1.6 mm.

A wall thickness of a hole wall of the lower hole portion formed by the second body may gradually decrease from top to bottom.

The lower hole portion may be straight, and an outer contour shape of a cross-section of the second body may gradually decrease from top to bottom.

A second aspect of the present application provides a glass fiber bushing, including a bushing body and the nozzle structure according to the first aspect provided on the bushing body.

The nozzle structure may be integrally formed with the bushing body.

A third aspect of the present application provides glass fiber production device, including a tank furnace, the bushing according to the second aspect, a sizing applicator, a gathering device, and a fiber drawing machine.

The tank furnace is provided with a liquid outlet.

The bushing is arranged on the liquid outlet, and the viscosity-increasing upper hole portion of the nozzle on the bushing is arranged opposite to the liquid outlet.

The sizing applicator, the gathering device, and the fiber drawing machine are arranged below the bushing at intervals in sequence.

The glass fiber production device may further include an air duct. A plurality of the air ducts are symmetrically arranged on both sides of the bushing. An air outlet of each of the air ducts is located between the bushing and the sizing applicator.

BRIEF DESCRIPTION OF THE DRAWINGS

The drawings incorporated into the specification and constituting a part of the specification illustrate the embodiments of the present application, and are used together with the descriptions to explain the principles of the embodiments of the present application. In these accompanying drawings, similar reference numerals are used to represent similar elements. The drawings in the following description are some rather than all of the embodiments of the present application. Those of ordinary skill in the art may obtain other drawings based on these drawings without creative efforts.

DETAILED DESCRIPTION

Figure 1:
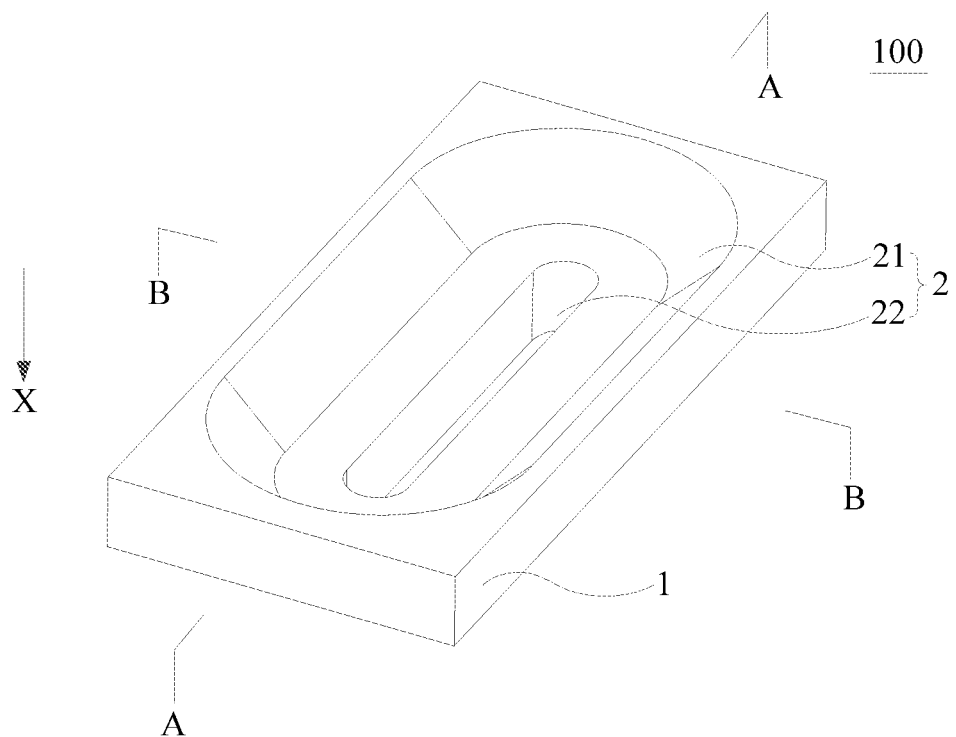
FIG. 1 exemplarily shows a schematic structural diagram of a glass fiber nozzle of the present application.

In order to make the objectives, technical solutions and advantages of the embodiments of the present application clearer, the following clearly and completely describes the technical solutions in the embodiments of the present application with reference to the accompanying drawings in the embodiments of the present application. Apparently, the described embodiments are some rather than all of the embodiments of the present application. All other embodiments obtained by those of ordinary skill in the art based on the embodiments of the present application without creative efforts should fall within the protection scope of the present application. It should be noted that without conflict, the embodiments in the present application and features in the embodiments may be combined with each other.

In the production process of flat cross-section glass fibers, the production equipment and processes for the flat cross-section glass fibers in the industry are different. In a production device, a plurality of grooves are arranged on a lower surface of a bushing. A cross-section of each groove is V-shaped, U-shaped or semi-circular. Each groove is provided with a plurality of pairs of nozzles arranged at intervals. These pairs of nozzles are adjacent to each other and symmetrically arranged relative to a central axis of the groove. The molten glass in a molten state flows out from ports of a pair of nozzles and is drawn into glass filaments. However, the above production device has the following problems: When a spacing between the two nozzles in a pair of nozzles is small, the two glass filaments are easily drawn into one glass filament, and the cross-sectional shape of the glass filament is similar to a circle; when a spacing between the two nozzles in a pair of nozzles is large, it is difficult for the two glass filaments to abut against each other in the drawing process, resulting in the formation of two glass filaments with circular cross-sections, which is not conducive to the formation of flat glass fibers; and in addition, the nozzle in the production device also has the problems of complex structure, unfavorable processing and short service cycle.

In another production device, by symmetrically arranging a plurality of protruding edges at a lower part of the nozzle, the molten glass in the molten state extends near the protruding edges, and is quenched and hardened in the direction perpendicular to a protruding edge and parallel to an axis line of the nozzle, so as to produce non-circular glass fibers with an oval or cocoon-shaped cross section. However, in the process of producing oval or cocoon-shaped cross-section glass fibers, the protruding edge of such nozzle is easily damaged, resulting in frequent replacement of the bushing.

In yet another production device, notches are arranged symmetrically on both sides of a long axis direction of the nozzle, and then the molten glass on both sides is cooled through a cooling medium. With this design, although the molten glass on both sides can be rapidly cooled and crystallized, which is conducive to the formation of the flat cross-section glass fibers, there is still the problem that the nozzle is easily damaged, which greatly reduces the service life of the bushing.

Alternatively, in an existing nozzle for producing glass fibers, the hole is in a rectangular shape, and the hole is further divided into an upper portion and a lower portion. A length of the upper portion is the same as that of the lower portion, and a width of the lower portion is greater than that of the upper portion. However, since the nozzle and the bushing are usually integrally formed, such a structure with a small top and a large bottom is very difficult to process, and the size controllability of the produced glass fibers is poor.

In a glass fiber nozzle of the present application, a hole is provided on the nozzle body, and the hole includes an upper hole portion and a lower hole portion that are connected in sequence. A projection of the lower hole portion is located within a projection of the upper hole portion in a projection on a plane perpendicular to an axis line of the lower hole portion. On the one hand, this method of large top and small bottom is more conducive to the processing of the nozzle structure, ensuring the processing accuracy and improving the processing efficiency. On the other hand, the viscosity of the molten glass is increased through the upper hole portion, and the lower hole portion has an aspect ratio of 5:1 to 12:1, such that an aspect ratio of glass fibers produced through the nozzle structure is maintained between 2.7:1 and 4.2:1. The smaller lower hole portion is more conducive to the size control of the glass fibers, thereby effectively improving the performance of the flat glass fibers.

A glass fiber nozzle structure provided according to the present application will be described in detail below with reference to the accompanying drawings.

FIG. 1 exemplarily shows a schematic structural diagram of a glass fiber nozzle structure of the present application.

According to an exemplary embodiment, as shown in FIG. 1 to FIG. 4, a glass fiber nozzle structure 100 provided by the present embodiment includes a nozzle body 1 and a hole 2, and the hole 2 is provided on the nozzle body 1.

Exemplarily, the hole 2 includes an upper hole portion 21 and a lower hole portion 22. The lower hole portion 22 is communicated with the upper hole portion 21, and the lower hole portion 22 is located below the upper hole portion 21. Molten glass enters the hole 2 from a top surface of the upper hole portion 21 and then flows out from the lower hole portion 22. In order to make the molten glass form flat glass fibers that meet usage requirements, the cross-section of the lower hole portion 22 is set to an elongated structure, and a ratio of a length to a width of the lower hole portion 22 is set to 5 to 12. It should be noted that the elongated shape refers to a structure whose sizes in one direction are greater than those in other directions.

A projection of the lower hole portion 22 is located within a projection of the upper hole portion 21 in a projection on a plane perpendicular to an axis line of the lower hole portion 22, such that a volume of the upper hole portion 21 is greater than that of the lower hole portion 22. For example, when the upper hole portion 21 is straight, the projection is a circle, and at this time, the projection of the lower hole portion 22 is located within the circle. For another example, when the upper hole portion 21 is tapered, the projection is a ring, and the projection of the lower hole portion 22 is located in the ring. With this design, the flow rate of the molten glass entering the upper hole portion 21 is greater than the flow rate of the molten glass flowing out from the lower hole portion 22. The molten glass is preliminarily cooled in the upper hole portion 21 to increase the viscosity of the molten glass, and then flows out from the lower hole portion 22, thereby facilitating the subsequent formation of the flat glass fibers.

In the glass fiber nozzle of the present application, the hole 2 is provided on the nozzle body 1, and the hole 2 includes the upper hole portion 21 and the lower hole portion 22 that are connected in sequence. A projection of the lower hole portion 22 is located within a projection of the upper hole portion 21 in a projection on a plane perpendicular to an axis line of the lower hole portion 22. On the one hand, this method of large top and small bottom is more conducive to the processing of the nozzle structure, ensuring the processing accuracy and improving the processing efficiency. On the other hand, the viscosity of the molten glass is increased through the upper hole portion 21, and the lower hole portion 22 has an aspect ratio of 5 to 12, such that an aspect ratio of glass fibers produced through the nozzle structure 100 is maintained between 2.7 and 4.2. The smaller lower hole portion 22 is more conducive to the size control of the glass fibers, thereby effectively improving the performance of the flat glass fibers.

In addition, in the present application, only one lower hole portion 22 for discharging the molten glass is provided in one nozzle structure 100. By controlling the aspect ratio of the lower hole portion 22 and matching the larger upper hole portion 21, the molten glass is discharged to form glass fiber, which is convenient for processing and can ensure the performance of the produced glass fibers.

Figure 2:
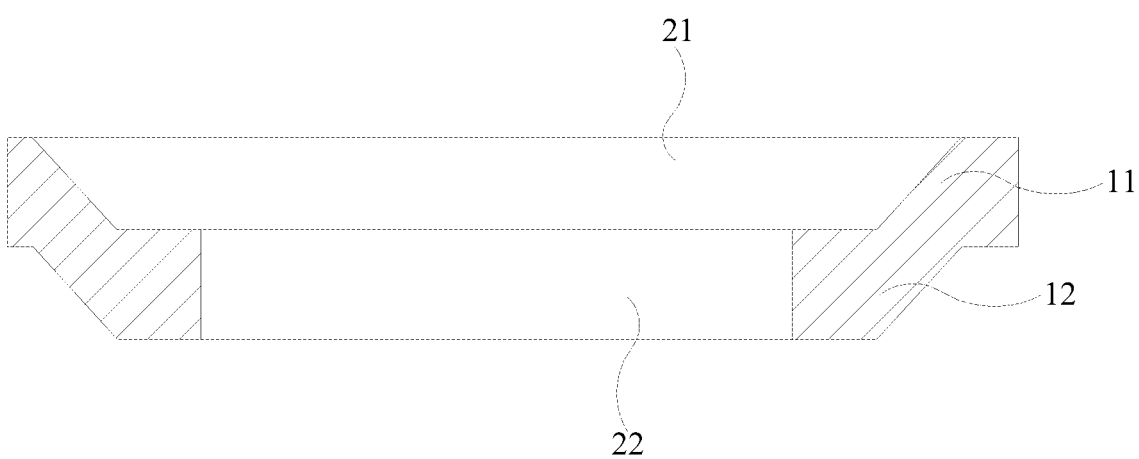
FIG. 2 is a cross-sectional view of FIG. 1 along a direction A-A.
Figure 3:
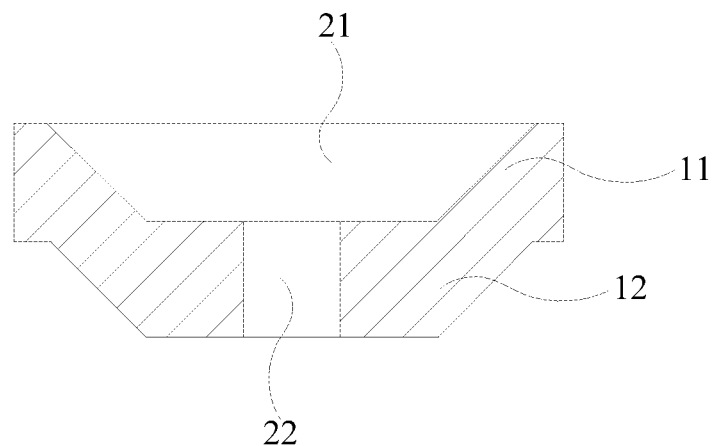
FIG. 3 is a cross-sectional view of FIG. 1 along a direction B-B.

Exemplarily, with reference to FIG. 2 and FIG. 3, the nozzle body 1 includes a first body 11 and a second body 12 which are connected. The second body 12 protrudes from a lower surface of the first body 11. The materials of the first body 11 and the second body 12 may be the same or different. In some embodiments, the first body 11 and the second body 12 are made of the same material and integrally formed to reduce the production cost of the nozzle body 1 and improve the production efficiency of the nozzle body 1.

Exemplarily, with reference to FIG. 1 to FIG. 4, when the hole 2 is in use, the upper hole portion 21 and the lower hole portion 22 are arranged in upper and lower positions, that is, the molten glass enters the hole 2 from the upper hole portion 21 and flows out from the lower hole portion 22. The upper hole portion 21 is provided in the first body 11, and the lower hole portion 22 is at least partially located in the second body 12.

The second body 12 has a predetermined wall thickness. In some embodiments, the predetermined wall thickness of the second body 12 ranges from 0.8 mm to 1.4 mm. In the actual production process of glass fibers, when the wall thickness of the second body 12 is small, for example, less than 0.8 mm, the second body 12 is easily damaged in the drawing process of the glass fibers. When the wall thickness of the second body 12 is large, for example, greater than 1.4 mm, it is not conducive to the heat dissipation of the glass fibers in the drawing process, and it is also not conducive to the formation of flat glass fibers that meet the usage requirements. Therefore, in the present embodiment, the preset wall thickness of the second body 12 is designed to be between 0.8 mm and 1.4 mm, which not only ensures that the second body 12 is not damaged in the continuous drawing process of the glass fibers, but also facilitates the processing and production, which is conducive to the heat dissipation of the glass fibers, thereby ensuring the flatness ratio of the glass fibers and improving the use performance of the glass fibers.

In some embodiments, as shown in FIG. 1 to FIG. 4, the lower hole portion 22 is formed inside the second body 12, and a wall thickness of a hole wall of the lower hole portion 22 formed by the second body 12 gradually decreases from top to bottom. It should be noted that the cross-sectional shape of the second body 12 may include an elongated shape or an oblong shape, which facilitates subsequent cooling of the produced glass fibers, and also reduces the production cost of the nozzle body 1.

That is, taking a plane parallel to a top surface of the first body 11 as a cross-section, the cross-sectional area of the second body 12 is a tapered structure in a first direction. The first direction can be understood as an extension direction from an end of the second body 12 connected to the first body 11 to an end of the second body 12 away from the first body 11, such as an X direction in FIG. 1. The direction can also be understood as an extension direction from top to bottom. It should be noted that the cross-sectional area of the second body 12 is designed as a tapered structure, such that when the molten glass passing through the nozzle structure flows out of the hole 2, the cooling medium passing through the nozzle structure, such as cooling liquid, can perform a cooling process with an increasing cooling effect on the molten glass in the first direction, and the molten glass is rapidly cooled, so as to avoid the influence of the high temperature molten glass on the service cycle of the nozzle structure.

Figure 4:
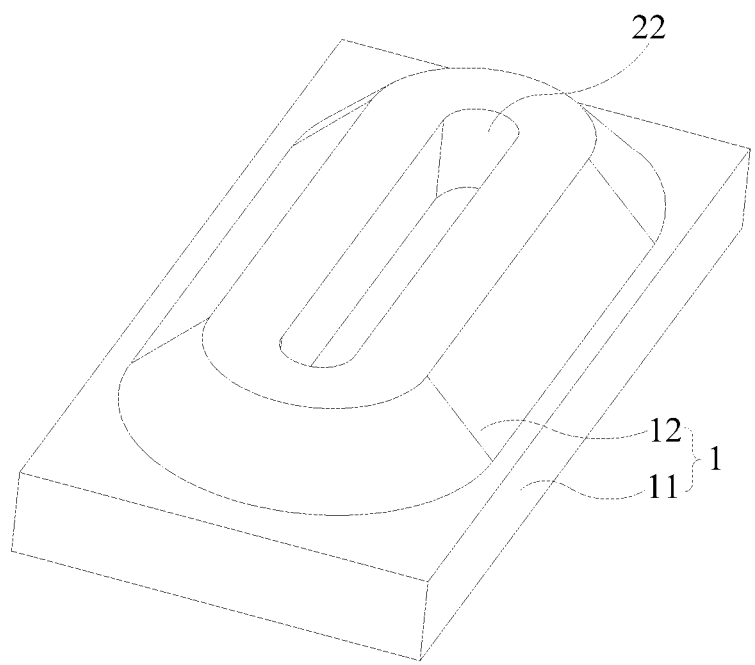
FIG. 4 exemplarily shows a schematic structural diagram of the glass fiber nozzle of the present application.

In some embodiments, with reference to FIG. 2 to FIG. 4, the lower hole portion 22 is straight, and an outer contour shape of a cross-section of the second body 12 gradually decreases from top to bottom, such that the wall thickness of the hole wall of the lower hole portion 22 formed in the second body 12 gradually decreases as described in the above embodiment, so as to improve the reliability of the structure, and ensure the forming quality of the glass fibers while cooling the glass fibers.

In some embodiments, the upper hole portion 21 has an elongated cross-section, and an extension direction of the cross-section of the upper hole portion 21 is the same as that of the cross-section of the lower hole portion 22 provided in the second body 12. Designing the upper hole portion 21 into an elongated shape, such as a rectangle, can improve the arrangement density of the nozzle structures on the bushing formed subsequently, thereby improving the production efficiency.

In a specific embodiment, the lower hole portion 22 in the second body 12 is arranged opposite to the upper hole portion 21 provided in the first body 11, that is, the axis line of the upper hole portion 21 and the axis line of the lower hole portion 22 coincide, which facilitates the processing and production of the nozzle structure 100 on the one hand, and makes the molten glass flow through the hole 2 more smoothly on the other hand.

In another specific embodiment, a length and width of the cross-section of the upper hole portion 21 have a ratio of 5:1 to 8:1. The setting of the aspect ratio of the upper hole portion 21 can effectively ensure the production requirements of the flatness of the glass fibers produced on the one hand, and can also ensure the volume of the upper hole portion 21 on the other hand, such that the molten glass flowing through the upper hole portion 21 is preliminarily cooled in the upper hole portion 21 to increase the viscosity of the molten glass, so as to facilitate subsequent production of the flat glass fibers.

As shown in FIG. 1 and FIG. 2, in some embodiments, taking a plane parallel to the top surface of the first body 11 as a cross-section, the cross-sectional area of the upper hole portion 21 is tapered. Since the viscosity of the molten glass is gradually increased in the process of flowing from top to bottom, it is designed so that the upper hole portion 21 is shaped like a funnel, the upper hole portion 21 of this structure facilitates the downward flow of the molten glass, and the molten glass flows out stably from the lower hole portion 22 to avoid the phenomenon of bubbles and the like inside the molten glass in the flowing process, so as to ensure the usage requirements of the glass fibers.

As an example, an inner wall surface of the upper hole portion 21 includes two opposite elongated inclined surfaces and conical surfaces respectively connecting two ends of the two elongated inclined surfaces. The elongated inclined surface is inclined from top to bottom in the direction of the central axis of the upper hole portion 21, and the radius of the conical surface gradually decreases from top to bottom. This design makes the glass fibers flow more smoothly and further improves the product quality of the glass fibers.

With reference to FIG. 1 to FIG. 4, in some embodiments, the upper hole portion 21 has a height of 0.8 mm to 1.4 mm. The upper hole portion 21 within this height range is convenient for processing and production, and can effectively ensure the service cycle of the nozzle structure 100 and the bushing formed subsequently and reduce the replacement frequency of the bushing. It should be noted that in the present embodiment, the cross-sectional shape of the upper hole portion 21 may include an elongated shape or an oblong shape. The upper hole portion 21 with an elongated or oblong cross-sectional shape can increase the volume of the upper hole portion 21 to ensure that a suitable volume of molten glass is stored in the upper hole portion 21, thereby ensuring the subsequent continuous production of the flat glass fibers.

As shown in FIG. 1 to FIG. 4, at least part of the lower hole portion 22 is provided in the second body 12. The lower hole portion 22 is communicated with the upper hole portion 21, and the lower hole portion 22 is located below the upper hole portion 21. The molten glass enters the hole 2 from the top surface of the upper hole portion 21 and then flows out from the lower hole portion 22. In order to make the molten glass form the flat glass fibers that meet usage requirements, the cross-section of the lower hole portion 22 is set to an elongated structure, and a ratio of a length to a width of the lower hole portion 22 is set to 5:1 to 12:1. It should be noted that in other embodiments, the cross-sectional shape of the lower hole portion 22 may also include an oblong shape, which is convenient for processing and production, and is convenient for forming the flat glass fibers according to the setting of the aspect ratio of the lower hole portion 22.

With reference to FIG. 2 and FIG. 3, in some embodiments, the lower hole portion 22 includes an inlet and an outlet. The inlet is communicated with the upper hole portion, and the outlet is configured for outflow of the molten glass. In an embodiment, the outlet of the lower hole portion 22 has a length between 6 mm and 8 mm and a width between 0.6 mm and 1.2 mm. With this design, when the size of the outlet of the lower hole portion 22 is within the above range, the cross-section of the glass fibers produced has a length of 21 µm to 40.5 µm and a width of 5 µm to 15 µm. Therefore, an aspect ratio of the cross-section of the glass fibers is maintained between 2.7 and 4.2, thereby meeting the usage requirements for the flat glass fibers in subsequent composite materials.

It should be noted that in some specific embodiments, a length and a width of the cross-section of the lower hole portion 22 have a ratio of 6:1 to 10:1, so as to facilitate the continuous production of the flat glass fibers. Since the cross-sectional area of the upper hole portion 21 is greater than that of the lower hole portion 22, the flow process of the molten glass from top to bottom is smoother, avoiding the phenomenon of frequent fiber breakage caused by insufficient supply of the molten glass.

In some embodiments, the lower hole portion 22 has a height of 0.8 mm to 1.6 mm. The lower hole portion 22 in this height range can keep the thickness of the subsequent bushing within a predetermined range, which can effectively reduce the processing difficulty of the nozzle structure 100 and the bushing, ensure the service cycle of the nozzle structure 100, facilitate the continuous production of the flat glass fibers, and reduce the replacement frequency of the bushing.

As shown in FIG. 1 to FIG. 3, in some embodiments, the upper hole portion 21 has a volume 2 to 5 times that of the lower hole portion 22. When a ratio of the volume of the upper hole portion 21 to the volume of the lower hole portion 22 is less than 2, the difference between a rate at which the molten glass flows through the upper hole portion 21 and a rate at which it flows through the lower hole portion 22 is small, which makes the molten glass easy to break in the drawing process and reduces the continuity of the glass fibers. When the ratio of the volume of the upper hole portion 21 to the volume of the lower hole portion 22 is greater than 5, the difference between the rate at which the molten glass flows through the upper hole portion 21 and the rate at which it flows through the lower hole portion 22 is relatively large, such that the impact of the molten glass on the lower hole portion 22 is increased. Moreover, since the molten glass is in a high temperature state, if the molten glass is stored in the upper hole portion 21 too much, the high temperature and high pressure will damage the connection position between the upper hole portion 21 and the lower hole portion 22, thereby significantly reducing the service cycle of the lower hole portion 22. Therefore, the volume of the upper hole portion 21 is designed to be 2 to 5 times that of the lower hole portion 22 to effectively ensure the continuous production of the flat glass fibers and improve the service cycle of the nozzle structure.

In some specific embodiments, the volume of the upper hole portion 21 is 2.4 to 4.5 times that of the lower hole portion 22. In the present embodiment, when the cross-section of the lower hole portion 22 is elongated or oblong, and the ratio of the length to the width of the cross-section of the lower hole portion 22 is 6:1 to 10:1, the smoothness of the drawing of the flat glass fibers and the continuity of the production of the flat glass fibers can be effectively improved, and the service cycle of the nozzle structure 100 can also be effectively guaranteed and prolonged. It should be noted that the cross-section of the flat glass fibers produced by the nozzle structure 100 in the present embodiment has an aspect ratio of 3:1 to 5:1, and the flat glass fibers have good specific surface area, tensile strength and bending strength, and can meet the usage requirements of the composite materials produced subsequently.

Figure 5:
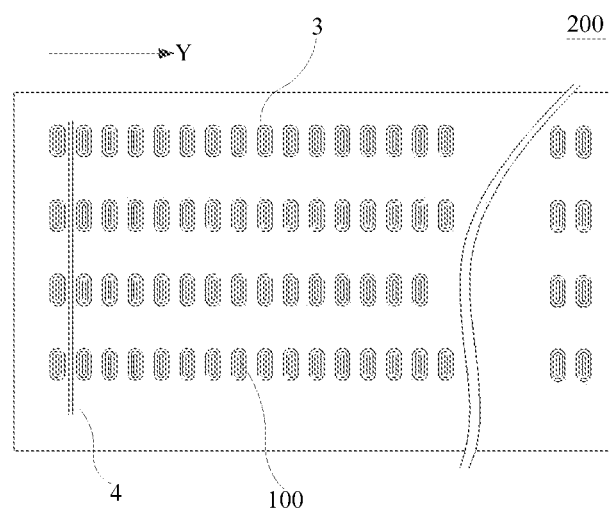
FIG. 5 exemplarily shows a schematic structural diagram of a glass fiber bushing of the present application.

According to an exemplary embodiment, as shown in FIG. 5, the glass fiber bushing 200 provided by the present embodiment includes a bushing body 3 and a nozzle structure 100.

In one embodiment, the bushing body 3 and the nozzle structure 100 are an integral structure, which is convenient for processing and production.

Exemplarily, the bushing body 3 may be in a rectangular or square shape.

With reference to FIG. 5, a plurality of nozzle structures 100 are provided on the bushing body 3. In a second direction, a plurality of nozzle structures 100 are arranged on the bushing body 3 in an array. The second direction can be understood as an extension direction along the length of the bushing body 3, such as a Y direction in FIG. 5. By arranging the nozzle structures 100 in an array on the bushing body 3, the heat radiated by the filamentous molten glass formed by the nozzle structures 100 is evenly dissipated, and the performance of the produced flat glass fiber bundles is improved.

It should be noted that the nozzle structures 100 can also be arranged on the bushing body 3 in other ways. For example, the adjacent nozzle structures 100 in the upper and lower rows are arranged in a staggered order, as long as the nozzle structures 100 are evenly arranged on the bushing body 3.

In some embodiments, the plurality of nozzle structures 100 on the bushing body 3 may be arranged in a manner of (50-100) rows×(5-30) columns, such that the total number of nozzle structures 100 on the bushing body 3 is maintained between 250 and 3,000, so as to meet the production requirements of the flat glass fibers.

In some specific embodiments, the plurality of nozzle structures 100 on the bushing body 3 are arranged in a manner of (60-80) rows×(10-20) columns, such that the total number of nozzle structures 100 on the bushing body 3 is maintained between 600 and 1,600, so as to meet the production requirements of the flat glass fibers, facilitate the processing and production of the bushing 200, and reduce the processing and production cost of the bushing 200.

As shown in FIG. 5, in some embodiments, the nozzle structure 100 may be embedded on the bushing body 3. In the extension direction from the top surface of the bushing body 3 to the bottom surface of the bushing body 3, the end face of the outlet of the nozzle structure 100 is 0.6 mm to 1.2 mm higher than the bottom surface of the bushing body 3, which is convenient to form a cone at the lower end of the nozzle structure 100 after the molten glass flows out from the bushing 200, so as to improve the forming quality and production efficiency of the flat glass fibers.

As shown in FIG. 5, in some embodiments, cooling channels 4 are arranged on the bushing body 3. In the Y direction, a plurality of cooling channels 4 are arranged at intervals. A cooling channel 4 is arranged between any two adjacent rows of nozzle structures 100, and an axis of the cooling channel 4 is arranged parallel to a long axis direction of the nozzle structure 100. It should be noted that a cooling medium is introduced into the cooling channel 4, and the cooling medium is convenient for cooling the long axis direction of the nozzle structure 100, such that the heat radiated by the filamentous molten glass is evenly cooled, and the molten glass is cooled and crystallized on both sides of the long axis of the hole 2 to facilitate the formation of the flat glass fibers.

In the above embodiment, by arranging the nozzle structures 100 in an array on the bushing body 3, and arranging the cooling channel 4 between any two adjacent rows of nozzle structures 100, the forming quality and production efficiency of the flat glass fibers are improved while meeting the production requirements of the flat glass fibers. In addition, the bushing 200 of the present embodiment has a long service cycle and is convenient for processing and production.

Figure 6:
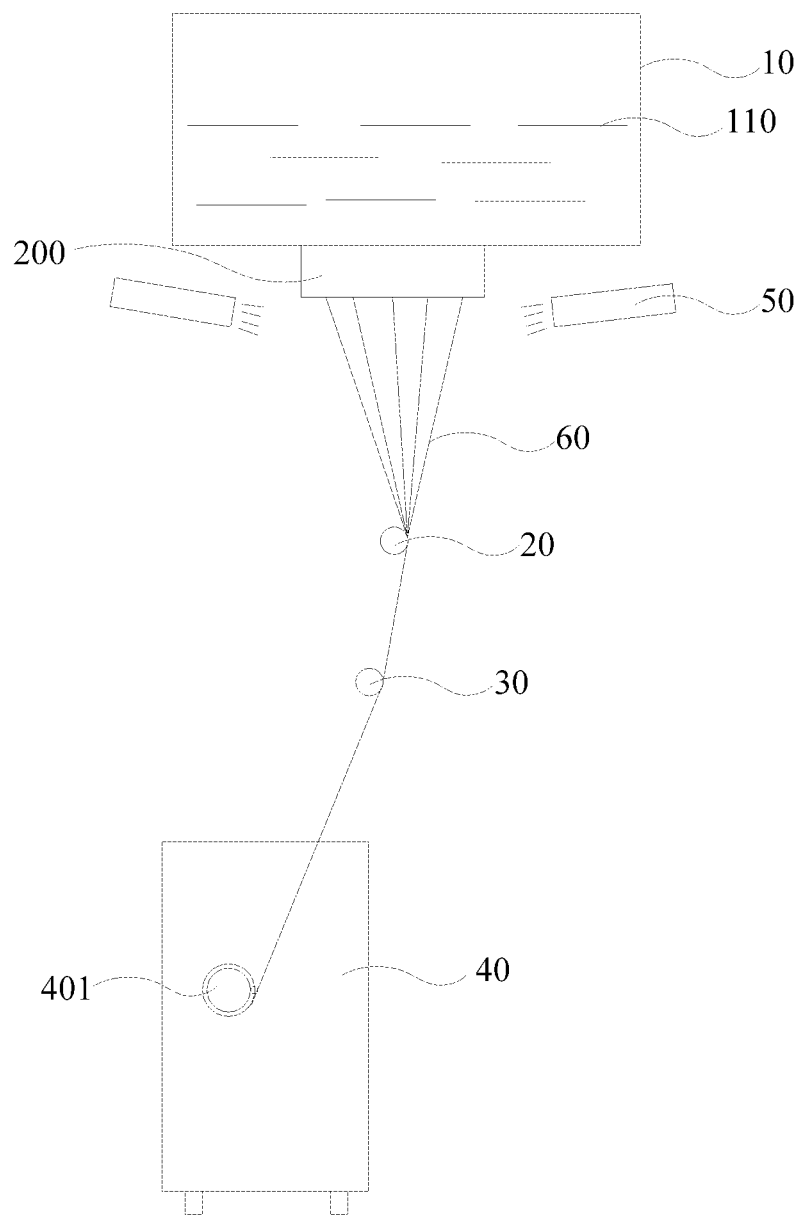
FIG. 6 exemplarily shows a schematic structural diagram of a glass fiber production device of the present application.

According to an exemplary embodiment, as shown in FIG. 6, the glass fiber production device provided by the embodiment includes a tank furnace 10, a bushing 200, a sizing applicator 20, a gathering device 30, and a fiber drawing machine 40.

Exemplarily, the tank furnace 10 is provided with a liquid outlet for the molten glass to flow out. The bushing 200 is arranged on the liquid outlet. The top surface of the upper hole portion 21 of the nozzle structure 100 on the bushing 200 is arranged opposite to the liquid outlet. The sizing applicator 20, the gathering device 30, and the fiber drawing machine 40 are arranged below the bushing 200 at intervals in sequence.

In some embodiment, as shown in FIG. 6, the glass fiber production device further includes air ducts 50. A plurality of the air ducts 50 are symmetrically arranged on both sides of the bushing 200, and an air outlet of each of the air ducts 50 is located between the bushing 200 and the sizing applicator 20, and is configured to cool both sides of the nozzle structure 100 and the glass fiber bundles flowing out of the hole 2 by spraying, so as to facilitate the formation of the flat glass fibers and improve the production efficiency of the flat glass fibers.

In the present embodiment, mineral powder 110 is transported into the tank furnace 10 to form the molten glass, and then the molten glass flows out through the flat nozzle structure 100 on the bushing 200 to form cones, and then form glass fibers 60. The glass fibers 60 are coated with a sizing composition through the sizing applicator 20, then bundled by the gathering device 30, and then wound on a collet 401 of the fiber drawing machine 40 to form a package. The air duct 50 is configured to air cool the formed glass fibers 60, so as to effectively improve the flatness ratio and production efficiency of the glass fibers.

According to the following Table 1, statistics are made on the parameters of the nozzle structure, the bushing, and the flat glass fibers (or non-circular cross-section glass fibers) produced by the corresponding production devices of the present application.

TABLE 1

Relevant parameters and product test data of glass fiber nozzle structure, bushing and process

| Parameter | Embodiment 1 | Embodiment 2 | Embodiment 3 | Embodiment 4 | Embodiment 5 |
|---|---|---|---|---|---|
| Glass formula for production of non-circular cross-section glass fibers | See patent application No. CN201811171285.X Novel Glass Fiber Composition | | | | |

TABLE 1-continued

Relevant parameters and product test data of glass fiber nozzle structure, bushing and process

| | | | | | |
|---|---|---|---|---|---|
| Thickness of bushing body/mm | 1.2 | 1.2 | 1.3 | 1.3 | 1.4 |
| Number of nozzles (row × column) | 50 × 5 | 60 × 5 | 60 × 6 | 60 × 7 | 60 × 8 |
| Cross-sectional shape of upper hole portion | Elongated | Elongated | Oblong | Oblong | Oblong |
| Section length of top surface of upper hole portion/mm | 11.0 | 11.0 | 11.0 | 11.0 | 11.0 |
| Section width of top surface of upper hole portion/mm | 6.5 | 6.5 | 6.2 | 6.2 | 6.0 |
| Section length of bottom surface of upper hole portion/mm | 9.0 | 9.0 | 9.0 | 9.0 | 9.0 |
| Section width of bottom surface of upper hole portion/mm | 4.2 | 4.0 | 4.0 | 3.5 | 3.5 |
| Height of upper hole portion/mm | 1.0 | 1.0 | 1.1 | 1.1 | 1.2 |
| Cross-sectional shape of lower hole portion | Elongated | Elongated | Oblong | Oblong | Elongated |
| Section length of lower hole portion/mm | 6.0 | 6.0 | 6.5 | 6.5 | 6.5 |
| Section width of lower hole portion/mm | 1.2 | 1.0 | 1.0 | 1.0 | 1.0 |
| Height of lower hole portion/mm | 1.2 | 1.2 | 1.3 | 1.3 | 1.4 |
| Wall thickness of second body/mm | 0.8 | 0.9 | 1.0 | 1.1 | 1.2 |
| Temperature of molten glass (° C.) | 1280 | 1270 | 1270 | 1260 | 1250 |
| Air velocity of air duct/(m/s) | 1.2 | 1.2 | 1.3 | 1.3 | 1.4 |
| Long diameter of cross-section of glass fibers (μm) | 29.7-40.5 | 23.2-34.8 | 21-33 | 23.8-34 | 21-31.5 |
| Short diameter of cross-section of glass fibers (μm) | 11-15 | 8-12 | 7-10 | 6-10 | 6-9 |
| Aspect ratio of cross-section of glass fibers | 2.7:1 | 2.9:1 | 3.0:1 | 3.4:1 | 3.5:1 |

| Parameter | Embodiment 6 | Embodiment 7 | Embodiment 8 | Embodiment 9 | Embodiment 10 |
|---|---|---|---|---|---|
| Glass formula for production of non-circular cross-section glass fibers | See patent application No. CN201811171285.X Novel Glass Fiber Composition | | | | |
| Thickness of bushing body/mm | 1.4 | 1.5 | 1.5 | 1.6 | 1.6 |
| Number of nozzles (row × column) | 60 × 9 | 60 × 10 | 60 × 11 | 60 × 12 | 60 × 12 |
| Cross-sectional shape of upper hole portion | Elongated | Elongated | Elongated | Oblong | Oblong |
| Section length of top surface of upper hole portion/mm | 10.0 | 10.0 | 10.0 | 10.0 | 10.0 |
| Section width of top surface of upper hole portion/mm | 6.0 | 5.8 | 5.8 | 5.6 | 5.6 |
| Section length of bottom surface of upper hole portion/mm | 9.0 | 9.0 | 9.0 | 9.0 | 9.0 |
| Section width of bottom surface of upper hole portion/mm | 3.5 | 3.5 | 3.5 | 3.5 | 3.5 |
| Height of upper hole portion/mm | 1.0 | 1.0 | 1.0 | 1.0 | 1.0 |
| Cross-sectional shape of lower hole portion | Oblong | Oblong | Elongated | Elongated | Elongated |
| Section length of lower hole portion/mm | 7.0 | 6.5 | 6.5 | 6.5 | 6.5 |
| Section width of lower hole portion/mm | 1.0 | 1.0 | 1.0 | 1.0 | 1.0 |
| Height of lower hole portion/mm | 1.4 | 1.5 | 1.5 | 1.6 | 1.6 |
| Wall thickness of second body/mm | 0.7 | 1.3 | 1.5 | 1.6 | 1.6 |
| Temperature of molten glass (° C.) | 1250 | 1250 | 1255 | 1255 | 1255 |
| Air velocity of air duct/(m/s) | 1.5 | 1.5 | 1.6 | 1.6 | 1.7 |
| Long diameter of cross-section of glass fibers (μm) | 21.6-32.4 | 22.8-34.2 | 24-36 | 24.6-32.8 | 21-33.6 |

TABLE 1-continued

Relevant parameters and product test data of glass fiber nozzle structure, bushing and process

| | | | | | |
|---|---|---|---|---|---|
| Short diameter of cross-section of glass fibers (μm) | 6-9 | 6-9 | 6-8 | 6-8 | 5-8 |
| Aspect ratio of cross-section of glass fibers | 3.6:1 | 3.8:1 | 4:1 | 4.1:1 | 4.2:1 |

Figure 7:
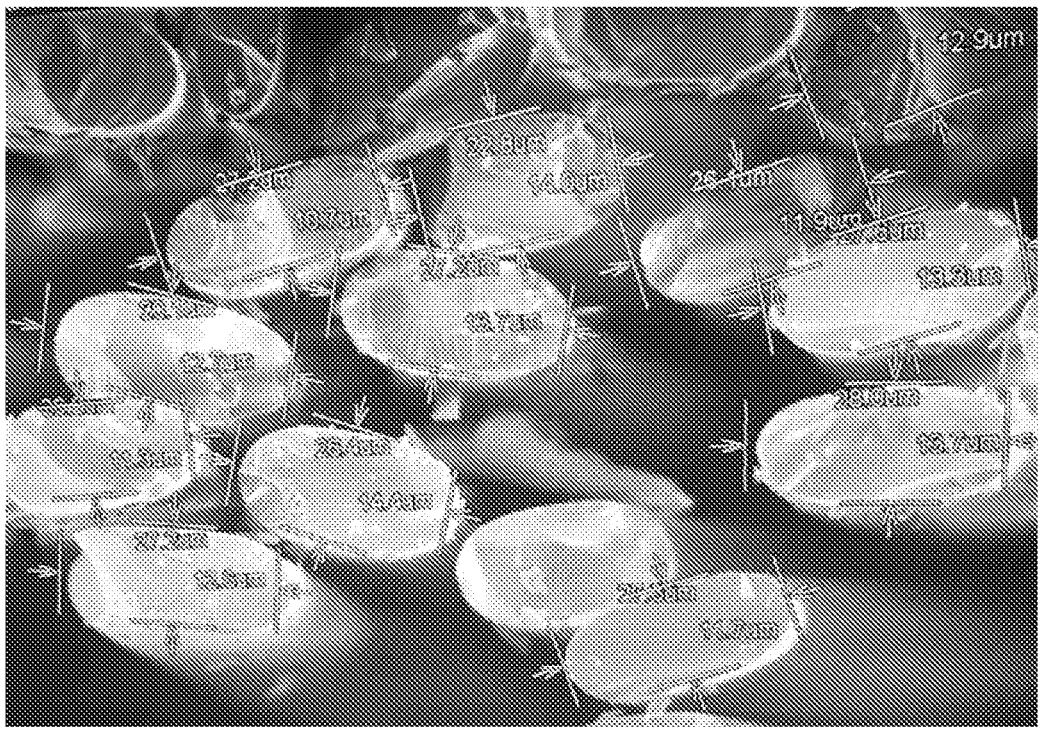
FIG. 7 exemplarily shows a scanning electron microscopy (SEM) image of flat glass fibers produced by the glass fiber production device of the present application.
Figure 8:
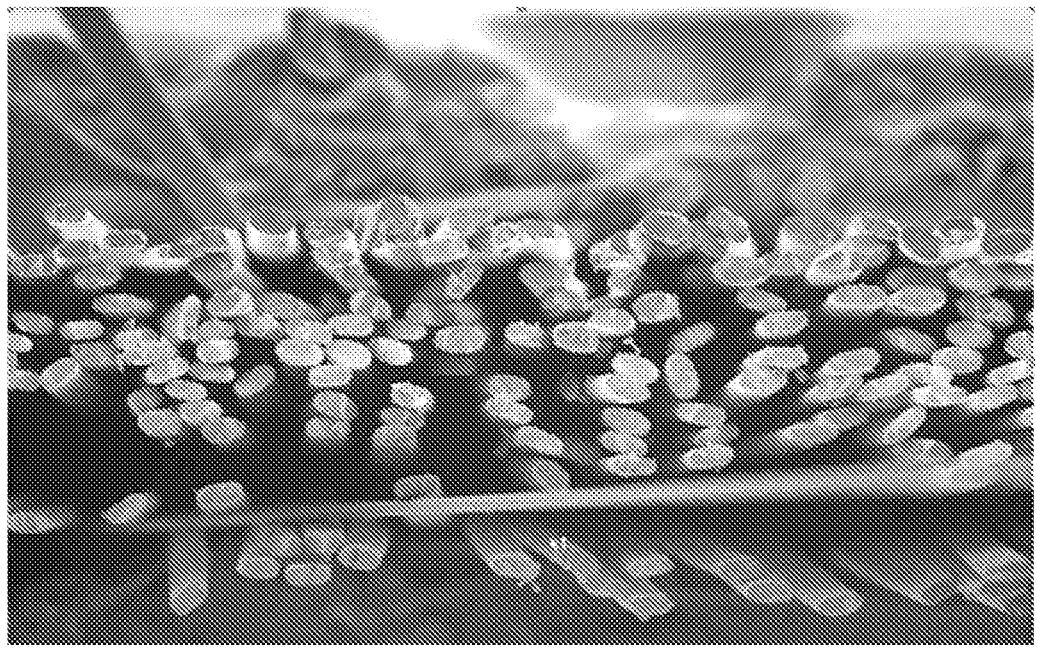
FIG. 8 exemplarily shows an SEM image of the flat glass fibers produced by the glass fiber production device of the present application.
Figure 9:
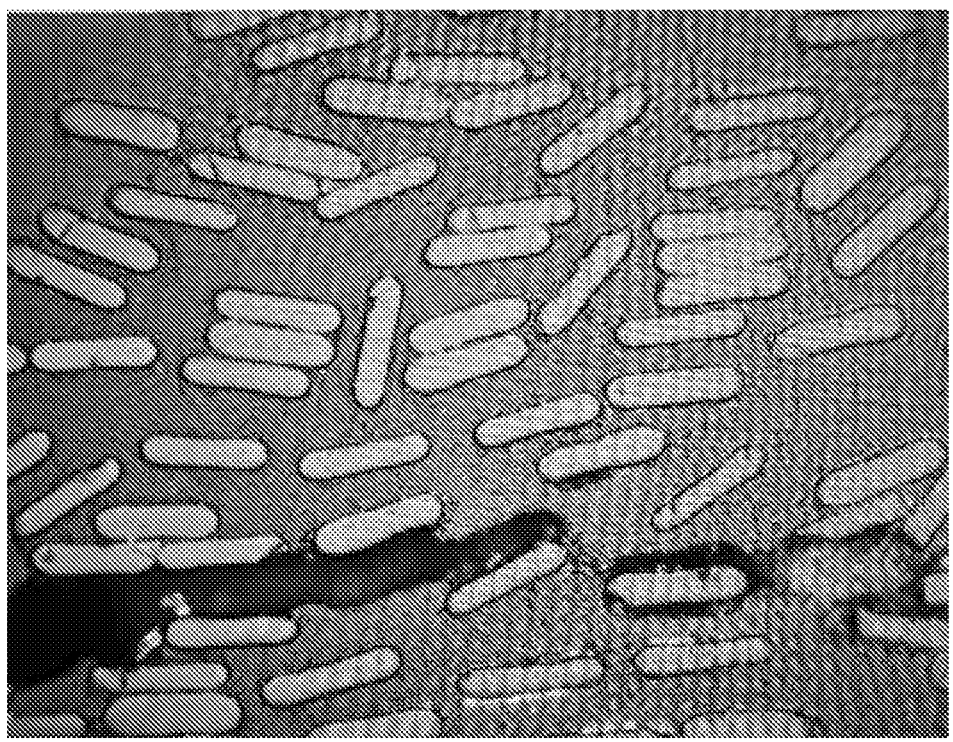
FIG. 9 exemplarily shows an SEM image of the flat glass fibers produced by the glass fiber production device of the present application.

FIG. 7 to FIG. 9 show SEM images of the nozzle structures and bushings shown in some embodiments and the flat glass fibers produced by the corresponding production device. FIG. 7 is an SEM image of flat glass fibers produced using the nozzle structure and the bushing of Embodiment 1. FIG. 8 is an SEM image of flat glass fibers produced using the nozzle structure and the bushing of Embodiment 3. FIG. 9 is an SEM image of flat glass fibers produced using the nozzle structure and the bushing of Embodiment 9.

The bushing structure of the present application has the advantages of simple structure, convenient production, and long service life. The production cost of the bushing is low, and the bushing is easy to be used on a large scale. It can be concluded from FIG. 7 to FIG. 9 and Table 1 that the glass fibers produced by the glass fiber production device of the present application have stable quality, and the cross-sectional aspect ratio is easy to control. The cross-sectional aspect ratio of the flat glass fibers produced is between 2.7:1 and 4.2:1, which can meet the performance requirements for the flat glass fibers in subsequent composite material production.

The content described above can be implemented individually or in various combinations, and these modifications are all within the protection scope of the present application.

It should be noted that relational terms herein such as "first" and "second" are merely used to distinguish one entity or operation from another entity or operation without necessarily requiring or implying any actual such relationship or order between such entities or operations. In addition, terms "include", "comprise", or any other variations thereof are intended to cover a non-exclusive inclusion, so that a process, a method, an article, or a device including a series of elements not only includes those elements, but also includes other elements that are not explicitly listed, or also includes inherent elements of the process, the method, the article, or the device. Without more restrictions, the elements defined by the sentence "including a . . . " do not exclude the existence of other identical elements in a process, method, article, or device including the elements.

Finally, it should be noted that the foregoing embodiments are only used to explain the technical solutions of the present application, and are not intended to limit the same. Although the present application is described in detail with reference to the foregoing embodiments, those of ordinary skill in the art should understand that they can still modify the technical solutions described in the foregoing embodiments, or make equivalent substitutions on some technical features therein. These modifications or substitutions do not make the essence of the corresponding technical solutions deviate from the spirit and scope of the technical solutions of the embodiments of the present application.

INDUSTRIAL APPLICABILITY

In a glass fiber nozzle structure of the present application, the hole is provided on the nozzle body, and the hole includes the upper hole portion and the lower hole portion that are connected in sequence. The projection of the lower hole portion is located within the projection of the upper hole portion in the projection on the plane perpendicular to the axis line of the lower hole portion. On the one hand, this method of large top and small bottom is more conducive to the processing of the nozzle structure, ensuring the processing accuracy and improving the processing efficiency. On the other hand, the viscosity of the molten glass in the molten state is increased through the upper hole portion, and the lower hole portion has an aspect ratio of 5:1 to 12:1, such that an aspect ratio of glass fibers produced through the nozzle structure is maintained between 2.7:1 and 4.2:1. The smaller lower hole portion is more conducive to the size control of the glass fibers, thereby effectively improving the performance of the flat glass fibers.

The invention claimed is:

1. A glass fiber nozzle structure, comprising a nozzle body and a hole provided on the nozzle body, wherein
   the hole comprises an upper hole portion and a lower hole portion in communication with the upper hole portion and located below the upper hole portion, the lower hole portion has an elongated cross-section, a projection of the lower hole portion is located within a projection of the upper hole portion in a projection on a plane perpendicular to an axis line of the lower hole portion, and a length and a width of the lower hole portion have a ratio of 5:1 to 12:1;
   a cross-sectional area of the upper hole portion is tapered from top to bottom; and
   a volume of the upper hole portion is 2 to 5 times a volume of the lower hole portion.

2. The glass fiber nozzle structure according to claim 1, wherein the upper hole portion has an elongated cross-section, and an extension direction of the cross-section of the upper hole portion is the same as an extension direction of the cross-section of the lower hole portion.

3. The glass fiber nozzle structure according to claim 2, wherein an axis line of the upper hole portion and the axis line of the lower hole portion coincide.

4. The glass fiber nozzle structure according to claim 2, wherein a length and a width of the cross-section of the upper hole portion have a ratio of 5:1 to 8:1.

5. The glass fiber nozzle structure according to claim 1, wherein the lower hole portion comprises an inlet and an outlet, the inlet is in communication with the upper hole portion, and the outlet is configured for outflow of molten glass in a molten state, and
   the outlet has a length between 6 mm and 8 mm and a width between 0.6 mm and 1.2 mm.

6. The glass fiber nozzle structure according to claim 1, wherein the nozzle body comprises a first body and a second body which are connected, the second body protrudes from a lower surface of the first body, the upper hole portion is provided in the first body, and the lower hole portion is at least partially located in the second body.

7. The glass fiber nozzle structure according to claim 6, wherein at least one of:

the upper hole portion has a height of 0.8 mm to 1.4 mm; or the lower hole portion has a height of 0.8 mm to 1.6 mm.

8. The glass fiber nozzle structure according to claim 6, wherein a wall thickness of a hole wall of the lower hole portion formed by the second body gradually decreases from top to bottom.

9. The glass fiber nozzle structure according to claim 8, wherein the lower hole portion is straight, and an outer contour shape of a cross-section of the second body gradually decreases from top to bottom.

10. A glass fiber bushing, comprising a bushing body and the glass fiber nozzle structure according to claim 1 provided on the bushing body.

11. The glass fiber bushing according to claim 10, wherein the glass fiber nozzle structure is integrally formed with the bushing body.

12. A glass fiber production device, comprising a tank furnace, the glass fiber bushing according to claim 10, a sizing applicator, a gathering device, and a fiber drawing machine, wherein
the tank furnace is provided with a liquid outlet;
the glass fiber bushing is arranged on the liquid outlet, and the upper hole portion of the glass fiber nozzle structure on the glass fiber bushing is arranged opposite to the liquid outlet; and
the sizing applicator, the gathering device, and the fiber drawing machine are arranged below the glass fiber bushing at intervals in sequence.

13. The glass fiber production device according to claim 12, further comprising a plurality of air ducts, wherein the plurality of air ducts are symmetrically arranged on both sides of the glass fiber bushing, and an air outlet of each of the plurality of air ducts is located between the glass fiber bushing and the sizing applicator.

* * * * *